(No Model.)

J. L. SCHRUBEN.
VEHICLE WHEEL.

No. 303,545.  Patented Aug. 12, 1884.

WITNESSES
Phil C. Dieterich
T. R. Keyworth

INVENTOR
James L. Schruben
by:
J. A. Alexander
Attorney

United States Patent Office.

JAMES L. SCHRUBEN, OF LAFAYETTE, INDIANA.

VEHICLE-WHEEL.

SPECIFICATION forming part of Letters Patent No. 303,545, dated August 12, 1884.

Application filed April 1, 1884. (No model.)

*To all whom it may concern:*

Be it known that I, JAMES L. SCHRUBEN, of Lafayette, in the county of Tippecanoe and State of Indiana, have invented certain new and useful Improvements in Wheels; and I do hereby declare that the following is a full, clear, and exact description thereof, reference being had to the accompanying drawings, and to the letters of reference marked thereon, which form part of this specification, in which—

Figure 1:
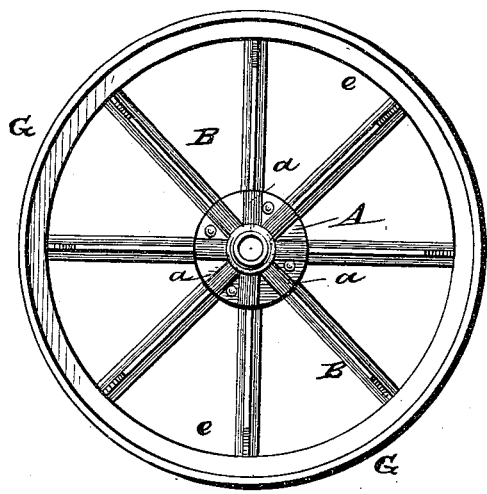
Figure 2:
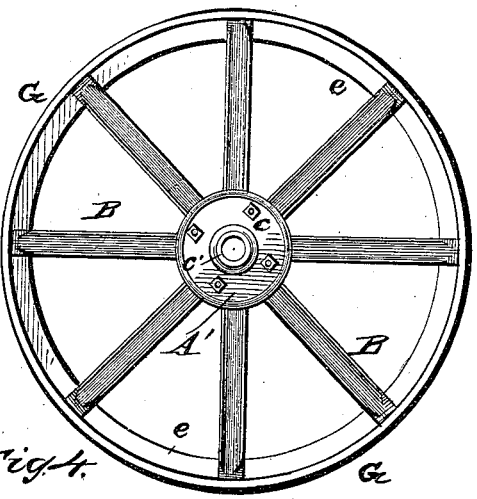
Figures 3, 4:
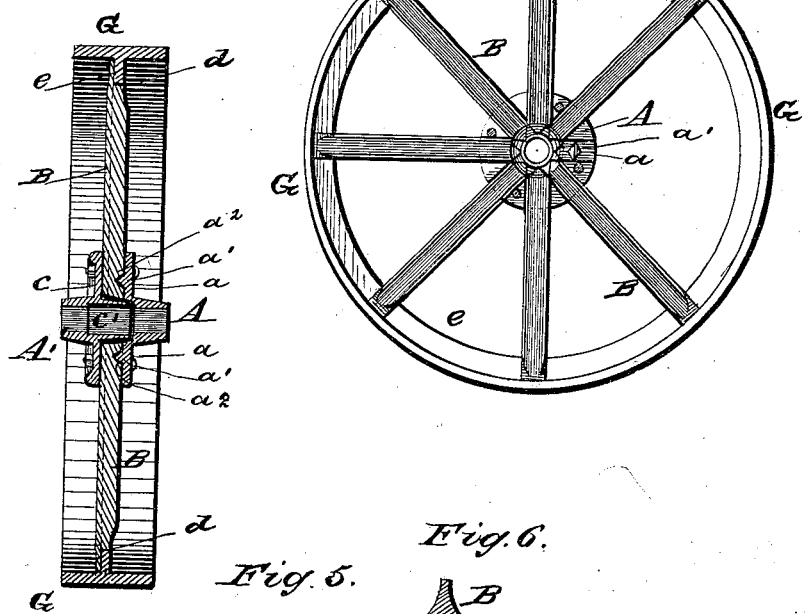
Figures 5, 6:
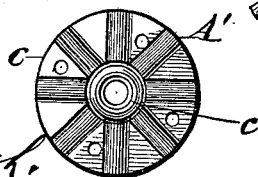

Figure 1 is a front view of my improved wheel. Fig. 2 is a view of the opposite side of the wheel complete. Fig. 3 is a diametrical section through the wheel. Fig. 4 is a face view of the wheel with the hub-section removed. Fig. 5 is a face view of the hub-section. Fig. 6 is a cross-section of one of the spokes.

The object of my invention is to improve the metal wheel which is described and illustrated in the schedule annexed to my Letters Patent No. 284,074, and dated on the 28th day of August, 1883.

The following description, when taken in connection with the annexed drawings, will fully explain my invention.

The hub of this wheel is constructed of two parts, designated by letters A A'. The hub A is ribbed externally, and these ribs $a$ are internally grooved for the purpose of receiving the inner ends of the spokes B. Near the eye of this section of the hub transverse ribs $a'$ are formed, adapted to engage with notches $a^2$, made into the spokes, and to aid in locking the same in place. The spokes B are made of angle-iron, having concave faces when taken in cross-section, as indicated in Fig. 6. It will be observed that the inner ends of my angular spokes are fitted to the outer hub-section, A. I now apply my inner hub-section, A', the disk $c$ and the sleeve $c'$ of which are an exact counterpart of the hub section A. When these sections are bolted together, the inner ends of the spokes are securely and rigidly locked in their places. The spokes may be made of malleable iron or of steel, and they are cut to form shoulders, as indicated at $d$, to fit the inside rim of the wheel, which I will now describe. This rim G is in cross-section T-shaped, and to the internal flange, $e$, are secured by rivets the external shouldered ends of the spokes. It will then be observed that the rim of the wheel is re-enforced by an internal flange; also, that the outer ends of the spokes are shouldered and rigidly secured to the said internal rim-flange; also, that the inner ends of the spokes are locked by notching and fitting them into a two-part hub; and, finally, it will be observed that each spoke is constructed of angle-iron, by means of which, together with the hub and rim fastenings, it will not only form a dish, but will hold it to its proper place and make a tight wheel.

Having described my invention, I claim—

1. In a vehicle-wheel, a two-part hub constructed with external radial ribs, internal grooves, transverse ribs crossing said grooves, and an internal sleeve, in combination with angular spokes, notched and shouldered, and fitted between the sections of the hub, and with an internally-flanged rim having the outer shouldered ends of the spokes riveted to the flange, all constructed and adapted to operate substantially in the manner and for the purposes described.

2. A metal wheel having shouldered and notched three-angle spokes, an internally-flanged rim, and a two-part hub constructed with radial ribs and grooves, and ribs crossing the latter, substantially as described.

In testimony that I claim the foregoing as my own I affix my signature in presence of two witnesses.

JAMES L. SCHRUBEN.

Witnesses:
CHRISTIAN M. NISLEY,
JAMES K. HILL.